United States Patent
Cherolis et al.

(10) Patent No.: US 9,920,651 B2
(45) Date of Patent: Mar. 20, 2018

(54) COOLING PASSAGES FOR A MID-TURBINE FRAME

(71) Applicant: United Technologies Corporation, Hartford, CT (US)

(72) Inventors: Anthony P. Cherolis, Hartford, CT (US); John H. Mosley, Portland, CT (US); Kalpendu J. Parekh, Colchester, CT (US); Christopher Treat, Manchester, CT (US); Alberto A. Mateo, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 477 days.

(21) Appl. No.: 14/598,492

(22) Filed: Jan. 16, 2015

(65) Prior Publication Data
US 2016/0208647 A1 Jul. 21, 2016

(51) Int. Cl.
| | | |
|---|---|---|
| *F01D 25/14* | (2006.01) | |
| *F01D 25/24* | (2006.01) | |
| *F01D 9/06* | (2006.01) | |
| *F02C 7/12* | (2006.01) | |
| *F01D 25/16* | (2006.01) | |
| *F01D 25/12* | (2006.01) | |

(52) U.S. Cl.
CPC ............. *F01D 25/14* (2013.01); *F01D 9/065* (2013.01); *F01D 25/12* (2013.01); *F01D 25/162* (2013.01); *F01D 25/24* (2013.01); *F02C 7/12* (2013.01); *F05D 2220/32* (2013.01); *F05D 2260/20* (2013.01); *Y02T 50/676* (2013.01)

(58) Field of Classification Search
CPC ........ F01D 25/14; F01D 25/12; F01D 25/162; F01D 25/24; F01D 9/065; F01D 9/06; F01D 7/12
See application file for complete search history.

(56) References Cited

U.S. PATENT DOCUMENTS 2,620,157 A * 12/1952 Morley ................. F01D 25/162
384/277
5,080,555 A * 1/1992 Kempinger ............. F01D 9/065
415/108

(Continued)

OTHER PUBLICATIONS

The Extended European Search Report for EP Application No. 16151372.6, dated May 18, 2016.

*Primary Examiner* — Richard Edgar
*Assistant Examiner* — John S Hunter
(74) *Attorney, Agent, or Firm* — Carlson, Gaskey & Olds, P.C.

(57) ABSTRACT

A mid-turbine frame for a gas turbine engine includes an inner frame case that includes a fluid passage. At least one spoke includes an inlet passage with at least one branch extending in an axial direction in fluid communication with the fluid passage in the inner frame case. A fitting fluidly connects the at least one branch to the fluid passage in the inner frame case. The fitting also includes a transfer tube connecting the cooling airflow passage to a cup boss. The transfer tube is fixed relative to the cylindrical portion and moveable relative to the cup boss. A swirler tube is in fluid communication with the fluid passage and is configured to direct cooling airflow in a radial inward and downstream direction.

16 Claims, 8 Drawing Sheets

(56) References Cited

U.S. PATENT DOCUMENTS

| | | |
|---|---|---|
| 7,195,447 B2 | 3/2007 | Moniz et al. |
| 8,061,969 B2 | 11/2011 | Durocher et al. |
| 8,091,371 B2 | 1/2012 | Durocher et al. |
| 2006/0093465 A1 | 5/2006 | Moniz et al. |
| 2008/0134687 A1 | 6/2008 | Kumar et al. |
| 2008/0253884 A1* | 10/2008 | Snyder .................. F01D 25/26 415/208.1 |
| 2010/0135770 A1 | 6/2010 | Durocher et al. |
| 2011/0079019 A1 | 4/2011 | Durocher et al. |
| 2011/0081237 A1 | 4/2011 | Durocher et al. |
| 2011/0189000 A1 | 8/2011 | Vedhagiri et al. |
| 2013/0094951 A1 | 4/2013 | McCaffrey |
| 2013/0192235 A1 | 8/2013 | Sanchez et al. |
| 2013/0219919 A1 | 8/2013 | Suciu et al. |
| 2014/0102110 A1 | 4/2014 | Farah et al. |

\* cited by examiner

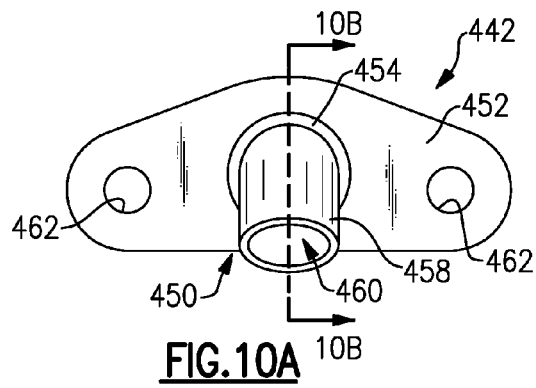
FIG.10A
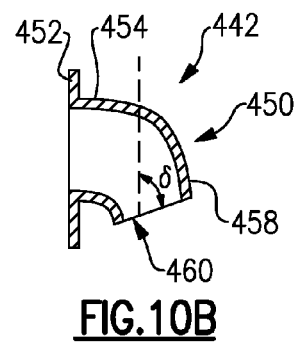
FIG.10B
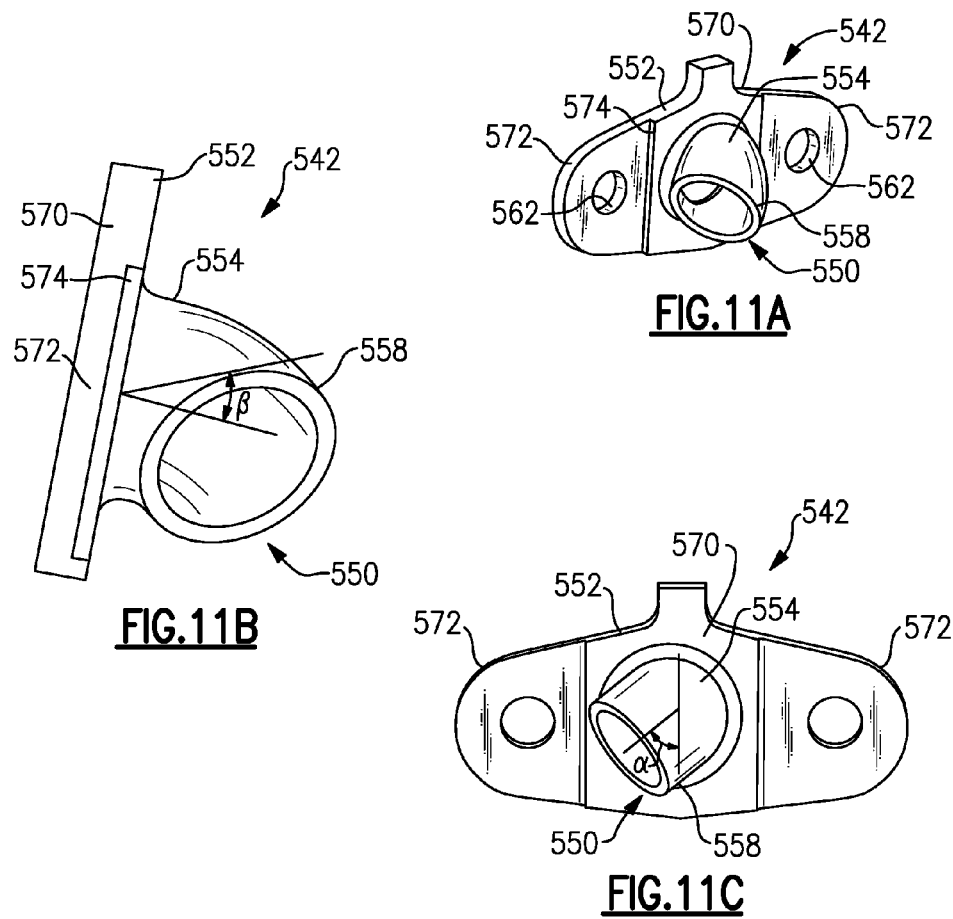
FIG.11A
FIG.11B
FIG.11C

US 9,920,651 B2

COOLING PASSAGES FOR A MID-TURBINE FRAME

BACKGROUND

The present disclosure relates generally to a gas turbine engine, and in particular to a mid-turbine frame (MTF) included in a gas turbine engine.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

A mid-turbine frame (MTF) is positioned between a high pressure turbine stage and a low pressure turbine stage of a gas turbine engine. The MTF supports one or more bearings and transfers bearing loads from an inner portion of the gas turbine engine to an outer engine frame. The MTF also serves to route air from the high pressure turbine stage to the low pressure turbine stage.

SUMMARY

In one exemplary embodiment, a mid-turbine frame for a gas turbine engine includes an inner frame case that includes a fluid passage. A swirler tube is in fluid communication with the fluid passage and is configured to direct cooling airflow in a radial inward and downstream direction.

In a further embodiment of the above, the swirler tube extends in a circumferential direction.

In a further embodiment of any of the above, the circumferential direction is directed at between approximately 50 and 80 degrees relative to a radial direction.

In a further embodiment of any of the above, the swirler tube is directed radially inward at an angle between approximately 15 and 45 degrees.

In a further embodiment of any of the above, the swirler tube includes an outlet directed radially inward at an angle between approximately 75 and 85 degrees.

In a further embodiment of any of the above, the swirler tube includes an inlet having a first cross sectional area and an outlet having a second cross-sectional area with the second cross-sectional area being larger than the first cross-sectional area.

In a further embodiment of any of the above, at least one spoke includes an inlet passage with at least one branch that extends in an axial direction and is in fluid communication with the fluid passage in the inner frame case.

In a further embodiment of any of the above, there is a fitting that connects the fluid passage to the inner frame case.

In another exemplary embodiment, a gas turbine engine includes a mid-turbine frame located axially between a first turbine and a second turbine. The mid-turbine frame includes an outer frame case and an inner frame case. At least one spoke connects the outer frame case to the inner frame case. The spoke includes a passage that extends in an axial direction. A swirler tube is in fluid communication with the passage and is configured to direct cooling airflow in a radial inward and downstream direction.

In a further embodiment of the above, the swirler tube extends in a circumferential direction.

In a further embodiment of any of the above, the circumferential direction is directed at between approximately 50 and 80 degrees relative to a radial direction.

In a further embodiment of any of the above, the swirler tube is directed radially inward at an angle between approximately 15 and 45 degrees.

In a further embodiment of any of the above, the swirler tube includes an outlet directed radially inward at an angle between approximately 75 and 85 degrees.

In a further embodiment of any of the above, the swirler tube includes an inlet having a first cross sectional area and an outlet having a second cross-sectional area. The second cross-sectional area is larger than the first cross-sectional area.

In a further embodiment of any of the above, at least one spoke includes an inlet passage with at least one branch that extends in an axial direction that is in fluid communication with the passage in the inner frame case.

In a further embodiment of any of the above, a restricting ring is located in at least one branch and a fitting connects the passage to the inner frame case.

In a further embodiment of any of the above, at least one branch extends in the axial direction and includes a portion with a reduced diameter for metering the cooling airflow through at least one branch.

In another exemplary embodiment, a method of cooling a portion of a gas turbine engine includes directing cooling airflow through a passage in an inner case and directing the cooling airflow through a swirler tube toward a low pressure turbine rotor in a radially inward and downstream direction.

In a further embodiment of any of the above, the method includes directing the cooling airflow in a circumferential direction.

In a further embodiment of any of the above, the swirler tube includes an inlet having a first cross sectional area and an outlet having a second cross sectional area with the second cross sectional area being larger than the first cross sectional area.

BRIEF DESCRIPTION OF THE DRAWINGS

FIG. 10A illustrates an end view of a further example swirler tube.

FIG. 10B illustrates a section view along line 10B-10B of FIG. 10A.

FIG. 11A illustrates a perspective view of still a further example swirler tube.

FIG. 11B illustrates a side view of the swirler tube of FIG. 11A.

FIG. 11C illustrates an end view of the swirler tube of FIG. 11A.

DETAILED DESCRIPTION

Figure 1:
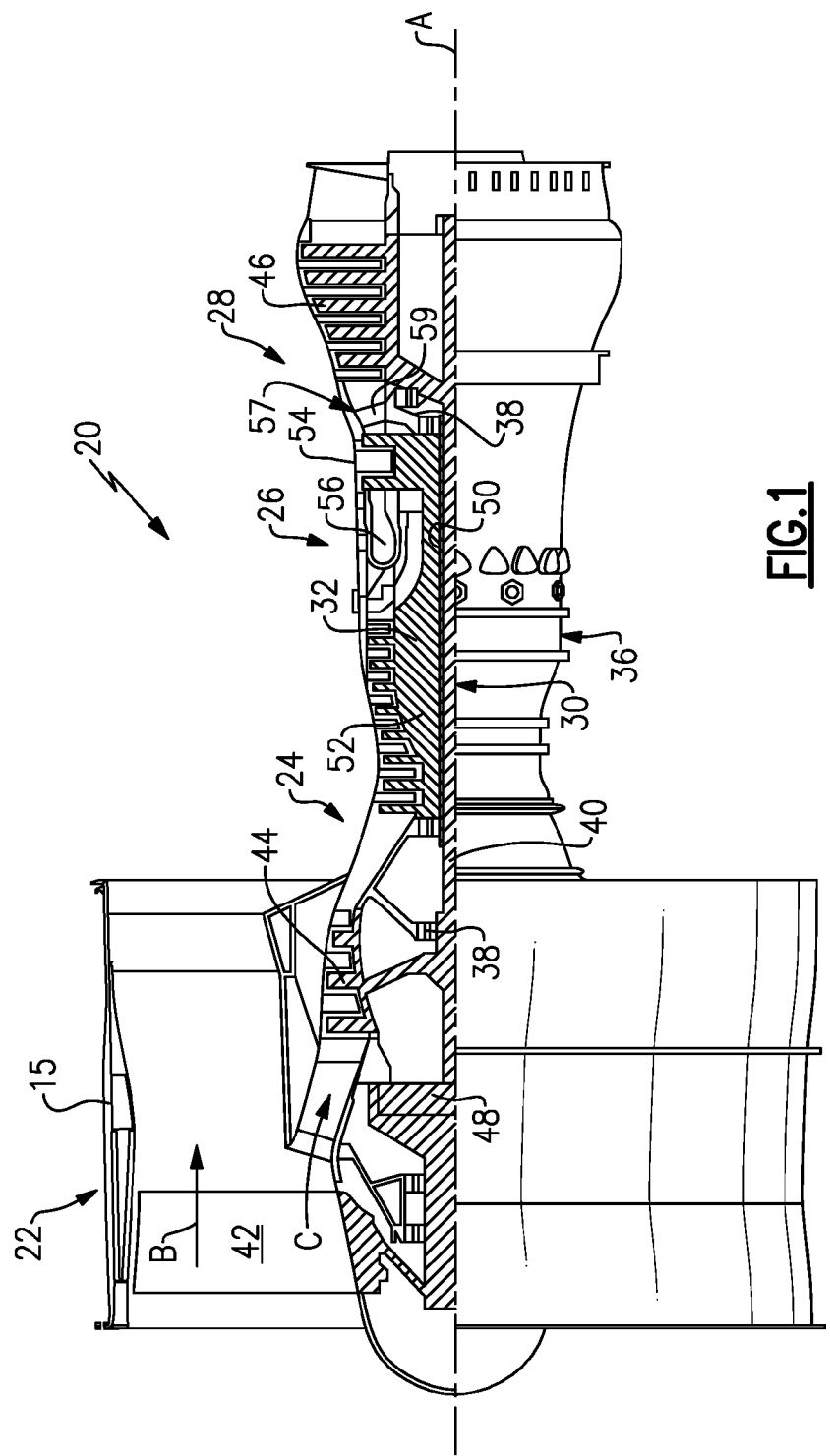
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[($Tram $° R)/(518.7° R)]^{0.5}$. The "Low corrected fan tip speed" as disclosed herein according to one non-limiting embodiment is less than about 1150 ft/second (350.5 meters/second).

The example gas turbine engine includes fan 42 that comprises in one non-limiting embodiment less than about 26 fan blades. In another non-limiting embodiment, fan section 22 includes less than about 20 fan blades. Moreover, in one disclosed embodiment low pressure turbine 46 includes no more than about 6 turbine rotors schematically indicated at 34. In another non-limiting example embodiment low pressure turbine 46 includes about 3 turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Figure 2:
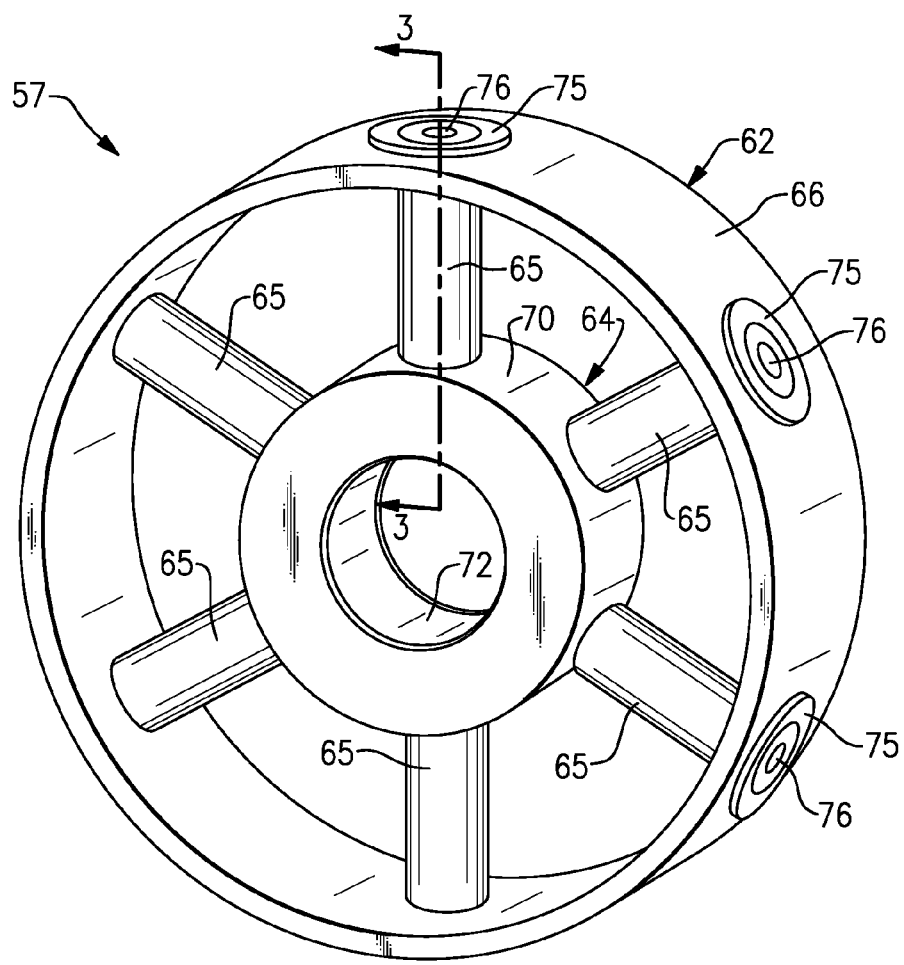
FIG. 2 is a schematic perspective view of an example mid-turbine frame in the gas turbine engine.

FIG. 2 is a schematic perspective view of one embodiment of the mid-turbine frame 57. The schematic view shown in FIG. 2 is high level conceptual view and is intended to illustrate relative positioning of various components, but not actual shape of various components. The mid-turbine frame 57 includes an outer frame case 62, an inner frame case 64, and a plurality of hollow spokes 65. The outer frame case 62 includes an outer diameter surface 66. The inner frame case 64 includes an outer diameter surface 70 and an inner diameter surface 72. In the embodiment shown in FIG. 2, six hollow spokes 65 are distributed around the circumference of the inner frame case 64 to provide structural support between the inner frame case 64 and the outer frame case 62. In alternative embodiments, the mid-turbine frame 57 can have more or less than six (6) hollow spokes.

The inner frame case 64 supports the rotor assembly via the bearing assemblies 38 (shown in FIG. 1), and distributes the force from the inner frame case 64 to the outer frame case 62 via the plurality of hollow spokes 65. Attachment of the hollow spokes 65 to the outer frame case 62 is provided at a plurality of bosses 75 located circumferentially around the outer diameter surface 66 of the outer frame case 62.

In one embodiment, attachment of the hollow spokes 65 at the plurality of bosses 75 may be secured by a retaining nut 106 (shown in FIG. 3) that allows the hollow spokes 65 to be tensioned. The hollow spokes 65 can be tensioned via a threaded connection so as to remain in tension during substantially all operating conditions of gas turbine engine 20. Apertures 76 formed in each of the plurality of bosses 75 allow cooling airflow to be distributed into a hollow portion of each of the hollow spokes 65. In this way, the cooling airflow is directed from the outer diameter through the hollow portions of the cooled hollow spokes 65 towards the inner frame case 64. The cooling airflow can function to cool the hollow spokes 65 and also to cool components radially inward of the inner frame case 64, such as the bearings 38. The cooling airflow is then directed to the low-rotor cavity 126 to cool the turbine rotors.

Figure 3:
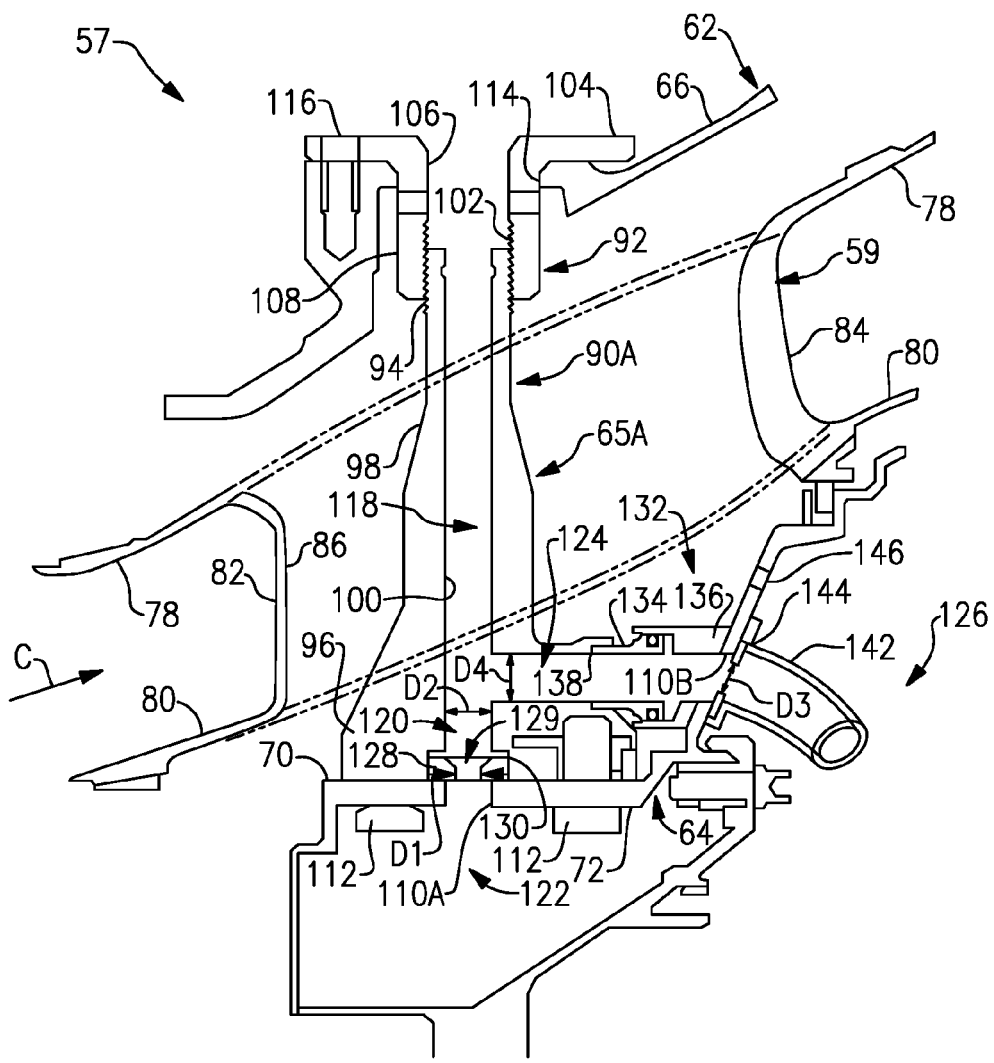
FIG. 3 is a sectional view taken along line 3-3 of FIG. 2.

FIG. 3 is a cross-sectional view of the mid-turbine frame 57 taken along line 3-3 of FIG. 2. A hollow spoke 65A is one example of the hollow spokes 65 shown in FIG. 2. The hollow spoke 65A extends from the outer frame case 62 through the airfoil 59 to the inner frame case 64. The airfoil 59 extends from an outer platform 78 to an inner platform 80. In the illustrated embodiment, the airfoil 59, the outer platform 78, and the inner platform 80 are integrally formed, and are all positioned radially inward of the outer frame case 62 and radially outward of the inner frame case 64. The airfoil 59, the outer platform 78, and the inner platform 80 define a portion of the core flow path C at the mid-turbine frame 57. The airfoil 59 extends axially from a leading edge 82 to a trailing edge 84. The airfoil 59 is oblong so as to be longer in the axial direction than in the circumferential direction. The airfoil 59 has a hollow interior 86, which is also relatively narrow in a chordal direction.

In the illustrated embodiment, the hollow spoke 65A includes a tie rod 90A and a retaining nut 92. The tie rod 90A is an elongated hollow tube that includes a threaded surface 94 at a radially outer end and a flange 96 at a radially inner end. The threaded surface 94 is on an outer surface 98 of the tie rod 90A. An inner passage surface 100 of the tie rod 90A defines an inlet passage 118 through the tie rod 90A. The tie rod 90A tapers along its length from the flange 96 at its radially inner end to the threaded surface 94 at its radially outer end.

The retaining nut 92 includes a threaded surface 102 at a radially inner end of the retaining nut 92 and a flange 104 at a radially outer end of the retaining nut 92. The threaded surface 102 is on an inner surface 106 of the retaining nut 92. The flange 104 extends outward from an outer surface 108 of the retaining nut 92.

In the illustrated embodiment, the flange 96 of the tie rod 90A abuts against the inner frame case 64 so that the inner passage surface 100 aligns with a hole 110A in the inner frame case 64. The flange 96 is attached to the inner frame case 64 via bolts 112. The retaining nut 92 extends through a hole 114 in the outer frame case 62 such that the flange 104 abuts against the outer diameter surface 66 of the outer frame case 62. The flange 104 is attached to the outer frame case 62 via a bolt 116. The bolt 116 extends through the flange 104 into the outer frame case 62. The tie rod 90A is threaded into the retaining nut 92 to attach the tie rod 90A to the retaining nut 92. In the illustrated embodiment, a portion but not all of the threaded surface 94 overlaps with a portion but not all of the threaded surface 102.

During assembly, the tie rod 90A is inserted through the hollow interior 86 of the airfoil 59 in a direction from radially inward to radially outward. The inner frame case 64 is then positioned radially inward of the tie rod 90A and attached to the tie rod 90A by the bolts 112. The retaining nut 92 is then inserted through the hole 114 and threadedly engaged with the tie rod 90A. The retaining nut 92 can be tightened, as desired, in a manner described below. Once the retaining nut 92 is suitably tightened on the tie rod 90A, the bolt 116 is inserted to fix the retaining nut 92 to the outer frame case 62 to prevent the retaining nut 92 from rotating and loosening.

Because the threaded surface 94 overlaps with the threaded surface 102 only partially, the threaded connection between the retaining nut 92 and the tie rod 90A is variable. The retaining nut 92 does not bottom out at any particular point when threaded on the tie rod 90A. This allows the retaining nut 92 to be threaded on the tie rod 90A to an extent determined during assembly, not predetermined prior to assembly. This allows the hollow spoke 65A, and the mid-turbine frame 57 in general, to be relatively insensitive to manufacturing tolerances.

The inlet passage 118 branches off between a first branch 120 extending into a bearing support cavity 122 and a second branch 124 extending into a low rotor cavity 126. The first branch 120 extends in a radially inward direction through the inner frame case 64.

A plug 128 is aligned with the first branch 120 and is located in an opening 130 in the hollow spoke 65A adjacent the outer diameter surface 70 of the inner frame case 64. The plug 128 includes an opening 129 having a conical radially outer portion that tapers to a cylindrical channel on a radially inner side. The cylindrical channel of the plug 128 includes a diameter D1 that is smaller than a diameter D2 defined by the inner passage surface 100. In the illustrated example, the plug 128 includes a diameter D1, however, the diameter D1 could be any dimension that is smaller than the dimension D2 in order to control the amount of cooling airflow that travels into the bearing support cavity 122. Although the plug 128 is shown contacting the hollow spoke 65A and the inner frame case 64, the plug 128 could be located anywhere within the first branch 120.

Alternatively, the plug 128 could be solid and prevent the cooling airflow from entering the bearing support cavity 122 so the entire cooling airflow must travel through the second branch 124. In yet another example embodiment, the opening 130 in the tie rod 90A could be reduced to the diameter D1 so that the plug 128 could be eliminated.

The second branch 124 extends in an axially downstream direction perpendicular to the first branch 120. Although the second branch 124 is shown being perpendicular to the first branch 120, the second branch 124 could be within 30 degrees of being perpendicular to the first branch 120. The second branch 124 is in fluid communication with the low rotor cavity through to a fitting 132 that extends through the inner frame case 64 and connects to a swirler tube 142.

Figure 4:
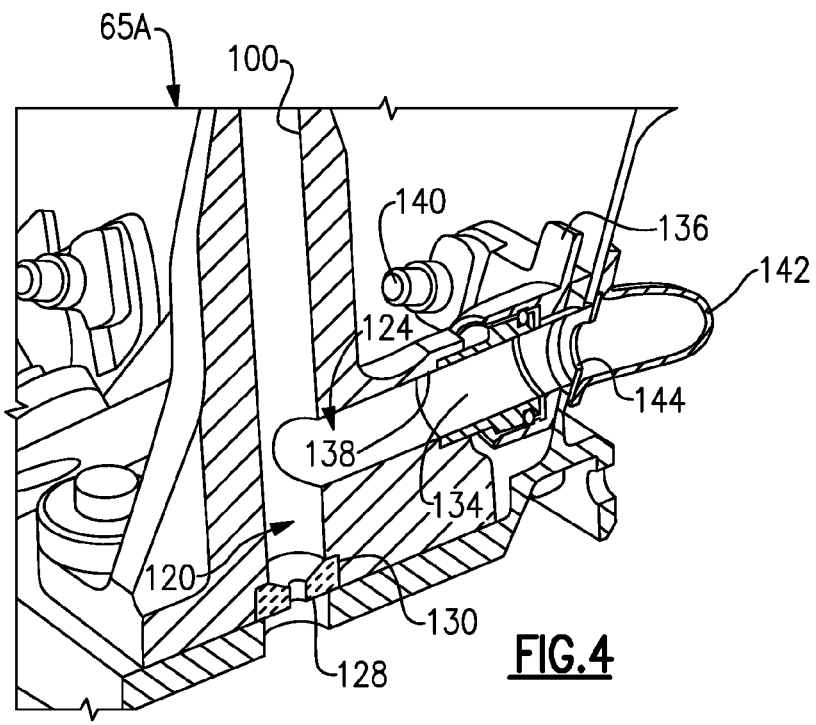
FIG. 4 is a perspective sectional view of an example hollow spoke.
Figure 5:
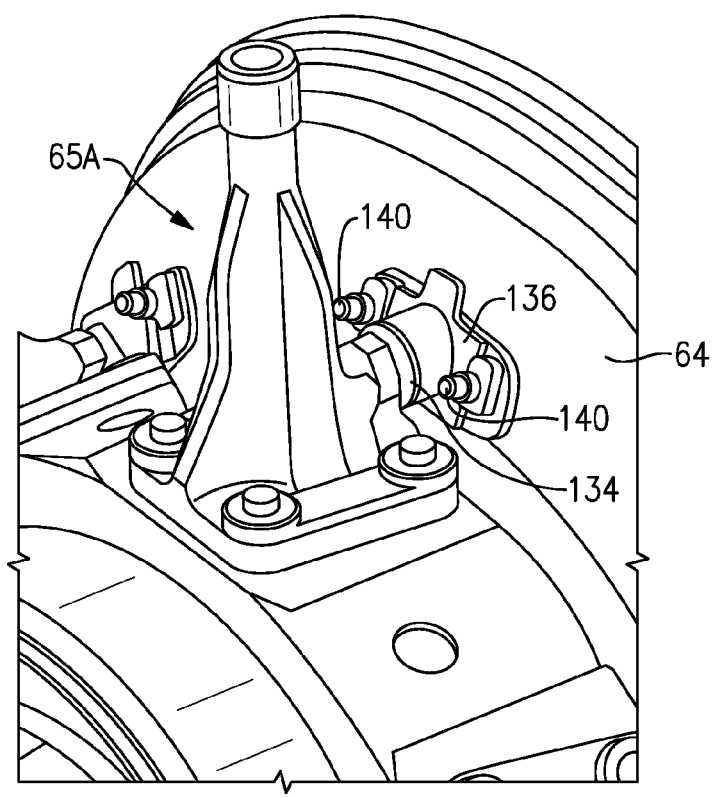
FIG. 5 is a perspective view of the hollow spoke.

The fitting 132 includes a transfer tube 134 pressed, welded, or brazed into an opening 138 in the hollow spoke 65A on a first end and engages a cup boss 136 on a second end. The transfer tube 134 could also be an integral part of the cup boss 136. A piston ring creates a seal between an outer diameter of the transfer tube 134 and the cup boss 136. As shown in FIGS. 4 and 5, the cup boss 136 is fastened to the inner frame case 64 with fasteners 140 and is aligned with a hole 110B in the inner frame case 64. The fasteners 140 also secure the swirler tube 142 to an opposite side of the inner frame case 64 from the cup boss 136. The swirler tube 142 directs the cooling airflow into the low rotor cavity in the direction of rotation of the low rotor to reduce turning and aerodynamic losses in the cooling airflow. By pre-swirling the cooling air flow prior to entering the low-rotor cavity 126, the heat up of the cooling air flow is reduced which lowers a temperature of the low-rotor cavity.

A restricting ring 144 is located between the swirler tube 142 and the inner diameter surface 72. The restricting ring 144 includes a diameter D3 which is smaller than a diameter D4 of the second branch 124. The restricting ring 144 restricts the amount of cooling airflow through the second branch 124 to aid in dividing the amount of cooling airflow traveling into the bearing support cavity 122 and the low-rotor cavity 126. Although the restricting ring 144 is shown between the swirler tube 142 and the inner frame case 64, the restricting ring 144 could be located anywhere within the second branch 124 to reduce the cooling airflow into the low-rotor cavity 126. Alternatively, or in addition to the restricting ring 144, a portion of the second branch 124 may include a portion with a reduced diameter, such as reducing a diameter of the second branch 124 extending through the transfer tube 134, the boss 136, or the hole 110B to meter the cooling airflow.

In one example, the a first portion of cooling airflow travels into the bearing support cavity 122 and a second portion of cooling airflow travels into the low-rotor cavity 126, with the second portion being greater than the first portion.

In the illustrated example, a cavity connecting opening 146 is located between the bearing support cavity 122 and the low-rotor cavity 126. The cavity connecting opening 146 may be removed or blocked to fluidly separate the bearing support cavity 122 from the low-rotor cavity 126. Separating the bearing support cavity 122 from the low-rotor cavity 126 can prevent cooling airflow mixed with oil in the bearing support cavity 122 from entering the low-rotor cavity 126.

Figure 6:
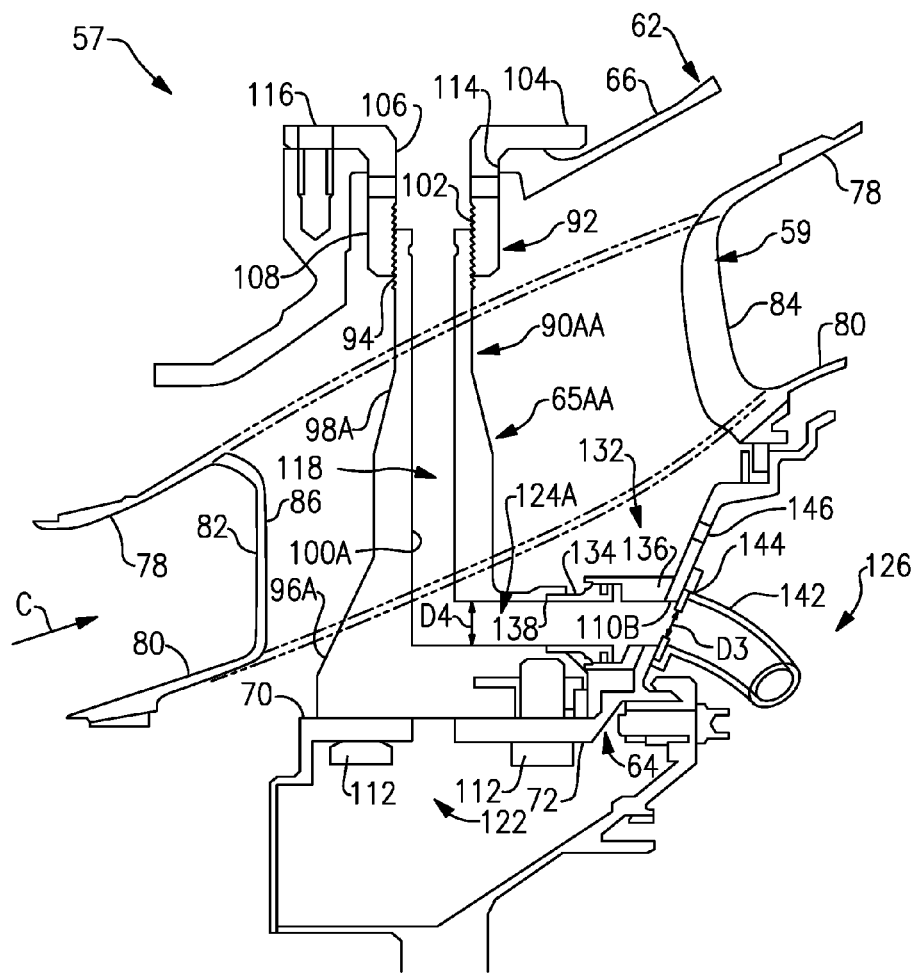
FIG. 6 illustrates another example mid-turbine frame.

FIG. 6 illustrates another example tie rod 90AA. The tie rod 90AA is similar to the tie rod 90AA except where described below or shown in the Figures. An inner passage surface 100A defines an inlet passage 118A and extends radially inward and branches off to a second branch 124A extending into the low rotor cavity 126.

The second branch 124A extends in an axially downstream direction perpendicular to the inlet passage 118'. Although the second branch 124A is shown being perpendicular to the inlet passage 118A, the second branch 124A could be within 30 degrees of being perpendicular to the inlet branch 118A. The second branch 124A is in fluid communication with the low rotor cavity 126 through to the fitting 132 which extends through the inner frame case 64 and connects to the swirler tube 142.

Figure 7A:
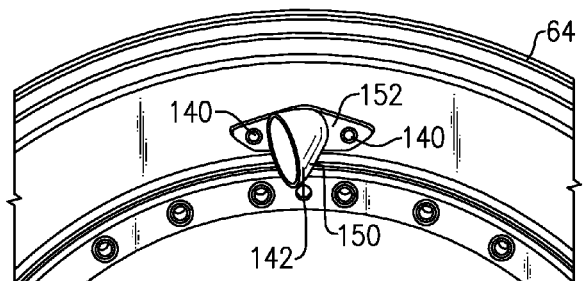
FIGS. 7A and 7B illustrate a perspective view of an example swirler tube.
Figure 7B:
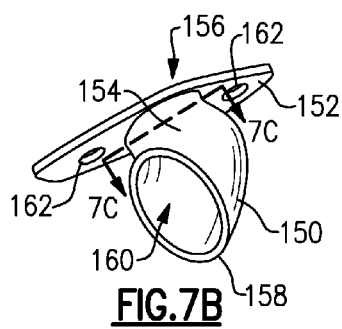
Figure 7C:
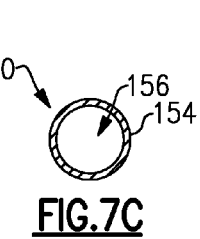
FIG. 7C illustrates a section view along line 7C-7C of FIG. 7B.

FIGS. 7A and 7B illustrate the swirler tube 142 attached to the inner frame case 64. The swirler tube 142 includes a nozzle 150 and a flange 152 directly contacting the inner frame case 64. The flange 152 includes a pair of fastener openings 162 for accepting the fasteners 140. The nozzle 150 includes a base portion 154 attached to the flange 152 and an end portion 158 spaced from the flange on a distal end of the nozzle 150. An inlet 156 to the nozzle 150 is defined by the base portion 154 of the nozzle 150 and extends perpendicular to the flange 152 and the inner frame case 64. In the illustrated example, the inlet 156 has circular cross section. (FIG. 7C). However, the inlet 156 could be elliptical, racetrack, or another shape.

In an alternate embodiment, the swirler tube 142 could be welded, brazed, or riveted to the inner frame case 64 or integrally cast as part of the inner frame case 64.

Figure 7D:
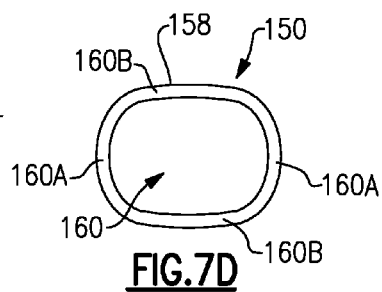
FIG. 7D is an end view of the example swirler tube.

The end portion 158 is located at a distal end of the nozzle 150 and defines an outlet 160. In the illustrated example, the outlet 160 includes a race track cross section with curved ends 160A spaced from each other by parallel portions 160B. (FIG. 7D). Alternatively, the outlet 160 could include an elliptical cross section.

The nozzle 150 turns the cooling airflow in the low-rotor cavity 126 in the direction of rotation of the low pressure turbine 46 and diffuses the cooling airflow as the cooling airflow travels through the nozzle 150. The nozzle 150 diffuses the cooling airflow because the inlet 156 includes a cross-sectional area that is smaller than the cross-sectional area of the outlet 160. The diffused cooling airflow results in a lower exit loss when the cooling airflow enters the slower rotational flow field of the low-rotor cavity 126.

The swirler tube 142 could be manufactured by casting-machining, fully machining, fabricated machining with welding, or direct metal laser sinter.

Figure 8A:
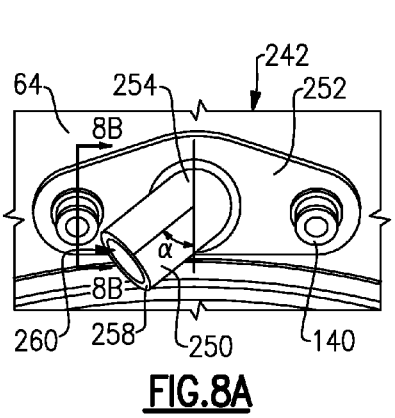
FIGS. 8A and 8C illustrate another example swirler tube.
Figure 8B:
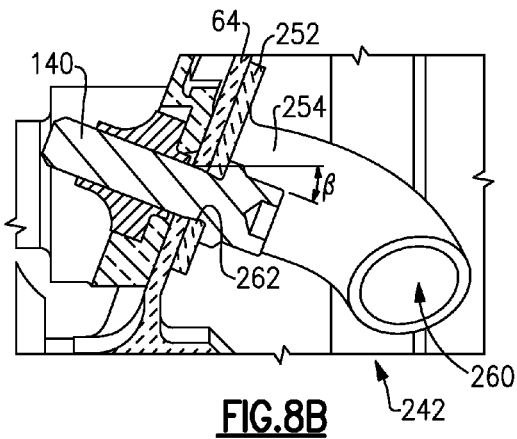
FIG. 8B illustrates a section view along line 8B-8B in FIG. 8A.

FIGS. 8A and 8B illustrate another example swirler tube 242. The swirler tube 242 is similar to the swirler tube 142 except where described below or shown in the Figures. The swirler tube 242 includes a nozzle 250 and a flange 252 directly contacting the inner frame case 64. The flange 252 includes a pair of fastener openings 262 for accepting the fasteners 140. The nozzle 250 includes a base portion 254 attached to the flange 252 and an end portion 258. The nozzle 250 includes a circular cross-section along a length of the nozzle 250. However, the nozzle 250 could include an elliptical, race track, or other cross-sectional shape.

Figure 8C:
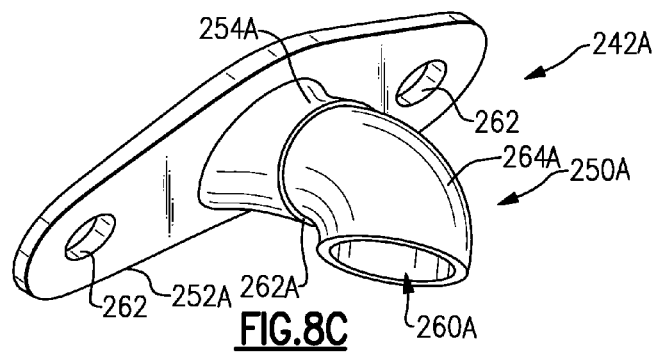

As shown in FIG. 8A, an outlet 260 of the nozzle 250 is directed circumferentially at an angle α relative to the radial direction. As shown in FIG. 8B, the nozzle 250 extends axially downstream and radially inward at an angle β. In the illustrated example, the angle α is approximately 70 degrees and the angle β is approximately 20.6 degrees. In another example, the angle α is between approximately 50 and 80 degrees and the angle β is between approximately 15 and 45 degrees FIG. 8C illustrates another example swirler tube 242A. The swirler tube 242A is similar to the swirler tube 242 except where described below or shown in the Figures with similar components followed by "A." A base portion 254A of a nozzle 250A is integral with a flange 252A. The base portion 254A includes an opening 262A for accepting an elbow 264A to direct the cooling airflow in the same direction as the nozzle 250. The elbow 264A is brazed or welded to the base portion 254A. The nozzle 250A includes an outlet 260A.

Figure 9A:
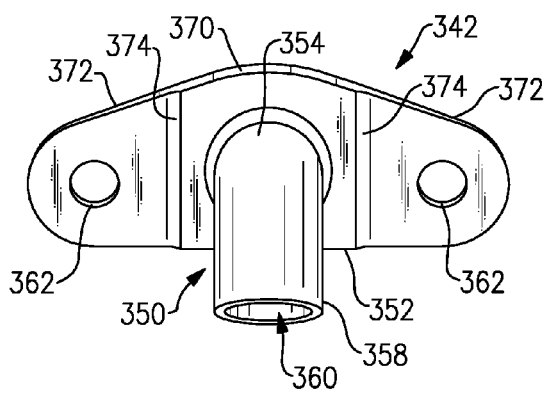
FIG. 9A illustrates an end view of yet another example swirler tube.
Figure 9B:
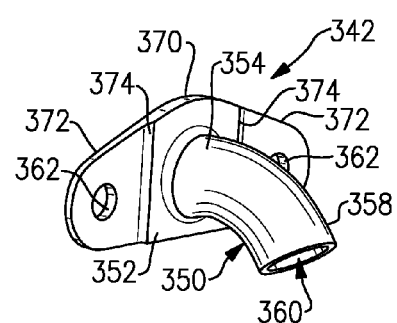
FIG. 9B illustrates a perspective view of the swirler tube of FIG. 9A.
Figure 9D:
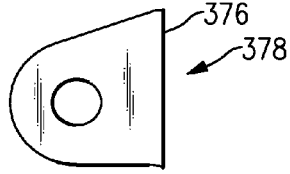
FIG. 9D illustrates an example fastener plate.
Figure 9C:
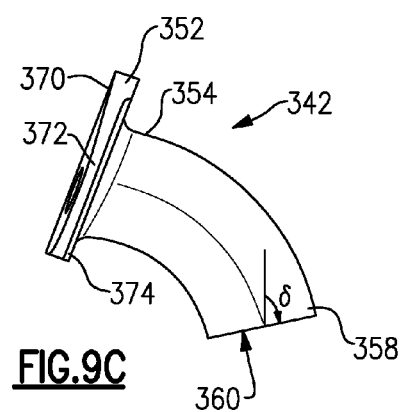
FIG. 9C illustrates a side view of the swirler tube of FIG. 9A.

FIGS. 9A-9C illustrate yet another example swirler tube 342. The swirler tube 342 is similar to the swirler tube 142 except where described below or shown in the Figures. The swirler tube 342 includes a nozzle 350 and a flange 352 with fastener openings 362 for accepting fasteners 140. The nozzle 350 includes a base portion 354 attached to the flange 352 and an end portion 358. In the illustrated example, the nozzle 350 includes a circular cross section. In another example, the nozzle 350 could include an elliptical cross section, race track cross section, and/or a cross section of increasing area.

An outlet 360 of the nozzle 350 is angled at an angle δ relative to radial direction as shown in FIG. 9C. In the illustrated example, the angle δ is approximately 78 degrees. In another example, the angle δ is between approximately 75 and 85 degrees. The outlet 360 does not extend in a circumferential direction and swirl the flow in the circumferential direction.

As shown in FIGS. 9A-9C, the flange 352 includes a middle portion 370 having a first thickness and a pair of outer portions 372 having a second thickness that is less than the first thickness. An anti-rotation lip 374 is located at an intersection of the middle portion 370 and the pair of outer portions 372. The anti-rotation lip 374 engages an edge 376 on a fastener plate 378 (FIG. 9D) to prevent rotation a head of the fastener 140.

FIGS. 10A and 10B illustrate a further example swirler tube 442. The swirler tube 442 is similar to the swirler tube 342 except where described below or shown in the Figures but with a leading "4." The swirler tube 442 includes a nozzle 450 attached to a flange 452 with fastener openings 462 for accepting fasteners 140. The nozzle 450 includes a base portion 454 and an end portion 458. In the illustrated example, the nozzle 450 includes a circular cross section. In another example, the nozzle 450 could include an elliptical cross section, race track cross section, and/or a cross section of increasing area.

An outlet 460 of the nozzle 450 is angled at an angle δ relative to radial direction as shown in FIG. 10B. In the illustrated example, the angle δ is approximately 78 degrees. The outlet 360 does not extend in a circumferential direction. In another example, the angle δ is between approximately 75 and 85 degrees.

FIGS. 11A-11C illustrate a further example swirler tube 542. The swirler tube 542 is similar to the swirler tube 142 except where described below or shown in the Figures. The swirler tube 542 includes a nozzle 550 and a flange 552 with fastener openings 562 for accepting fasteners 140. The nozzle 550 includes a base portion 554 attached to the flange 552 and an end portion 558. In the illustrated example, the nozzle 550 includes a circular cross section. In another example, the nozzle 550 could include an elliptical cross section, race track cross section, and/or a cross section of increasing area.

As shown in FIG. 11C, an outlet 560 of the nozzle 550 is directed circumferentially inward at an angle α relative to the radial direction. As shown in FIG. 11B, the nozzle 550 extends axially downstream and radially inward at an angle β. In the illustrated example, the angle α is approximately 70 degrees and the angle β is approximately 20.6 degrees.

The flange 552 includes a middle portion 570 having a first thickness and a pair of outer portions 572 having a second thickness that is less than the first thickness. An anti-rotation lip 574 is located at an intersection of the middle portion 570 and the pair of outer portions 572. The anti-rotation lip 574 engages an edge 576 on a fastener plate 578 (FIG. 9D) to prevent rotation of a head of the fastener 140.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A mid-turbine frame for a gas turbine engine comprising:
   an inner frame case including a fluid passage;
   at least one spoke including an inlet passage with at least one branch extending in an axial direction in fluid communication with the fluid passage in the inner frame case;
   a fitting fluidly connecting the at least one branch to the fluid passage in the inner frame case, wherein the fitting includes a transfer tube connecting the cooling airflow passage to a cup boss, wherein the transfer tube is fixed relative to a cylindrical portion and moveable relative to the cup boss; and
   a swirler tube in fluid communication with the fluid passage configured to direct cooling airflow in a radial inward and downstream direction.

2. The mid-turbine frame of claim 1, wherein the swirler tube extends in a circumferential direction.

3. The mid-turbine frame of claim 2, wherein the circumferential direction is directed at between 50 and 80 degrees relative to a radial direction.

4. The mid-turbine frame of claim 1, wherein the swirler tube is directed radially inward at an angle between 15 and 45 degrees relative to an axial direction.

5. The mid-turbine frame of claim 1, wherein the swirler tube includes an outlet directed radially inward at an angle between approximately 75 and 85 degrees relative to a radial direction.

6. The mid-turbine frame of claim 1, wherein the swirler tube includes an inlet having a first cross sectional area and an outlet having a second cross-sectional area with the second cross-sectional area being larger than the first cross-sectional area.

7. The gas turbine engine of claim 1, further comprising a restricting ring located in the at least one branch and a fitting connecting the passage to the inner frame case.

8. A gas turbine engine comprising:
   a mid-turbine frame located axially between a first turbine and a second turbine, the mid-turbine frame comprising:
   an outer frame case;
   an inner frame case including a fluid passage;
   at least one spoke connecting the outer frame case to the inner frame case, wherein the spoke includes an inlet passage with at least one branch extending in an axial direction in fluid communication with the fluid passage in the inner frame case; and
   a fitting fluidly connecting the at least one branch to the fluid passage in the inner frame case, wherein the fitting includes a transfer tube connecting the cooling airflow passage to a cup boss, wherein the transfer tube is fixed relative to the cylindrical portion and moveable relative to the cup boss; and
   a swirler tube in fluid communication with the fluid passage and configured to direct cooling airflow in a radial inward and downstream direction.

9. The gas turbine engine of claim 8, wherein the swirler tube extends in a circumferential direction.

10. The gas turbine engine of claim 9, wherein the circumferential direction is directed at between 50 and 80 degrees relative to a radial direction.

11. The gas turbine engine of claim 8, wherein the swirler tube is directed radially inward at an angle between 15 and 45 degrees relative to an axial direction.

12. The gas turbine engine of claim 8, wherein the swirler tube includes an outlet directed radially inward at an angle between 75 and 85 degrees relative to a radial direction.

13. The gas turbine engine of claim 8, wherein the swirler tube includes an inlet having a first cross sectional area and an out let having a second cross-sectional area with the second cross-sectional area being larger than the first cross-sectional area.

14. A method of cooling a portion of a gas turbine engine comprising:
   directing cooling airflow through an inlet passage in at least one spoke, the inlet passage including at least one branch extending in an axial direction;
   directing cooling airflow through a fitting fluidly connected downstream of the at least one branch, wherein the fitting includes a transfer tube connecting the cooling airflow passage to a cup boss, wherein the transfer tube is fixed relative to the cylindrical portion and moveable relative to the cup boss;
   directing the cooling airflow through a passage in an inner case fluidly connected downstream of the fitting; and
   directing the cooling airflow through a swirler tube toward a low pressure turbine rotor in a radially inward and downstream direction.

15. The method of claim 14, further comprising directing the cooling airflow in a circumferential direction.

16. The method of claim 15, wherein the swirler tube includes an inlet having a first cross sectional area and an outlet having a second cross sectional area with the second cross sectional area being larger than the first cross sectional area.

* * * * *